(12) United States Patent
Takeuchi

(10) Patent No.: US 6,424,428 B1
(45) Date of Patent: Jul. 23, 2002

(54) PRINTING APPARATUS AND IMAGE PROCESSING METHOD FOR THE PRINTING APPARATUS

(75) Inventor: Ryosuke Takeuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/159,750

(22) Filed: Sep. 24, 1998

(30) Foreign Application Priority Data

Sep. 26, 1997 (JP) .............................................. 9-278031
Sep. 3, 1998 (JP) ............................................ 10-250082

(51) Int. Cl.$^7$ .............................................. G06K 15/02
(52) U.S. Cl. ...................... 358/1.16; 358/1.17; 358/524
(58) Field of Search ................................. 358/1.5, 1.11, 358/1.12, 1.13, 1.14, 1.15, 1.16, 1.17, 523, 524, 404; 707/205; 711/2, 6, 105, 203

(56) References Cited

U.S. PATENT DOCUMENTS

| | | | | |
|---|---|---|---|---|
| 5,142,667 A | * | 8/1992 | Dimperio et al. | 358/1.16 |
| 5,696,926 A | * | 12/1997 | Culbert et al. | 711/203 |
| 5,764,866 A | * | 6/1998 | Maniwa | 358/1.15 |
| RE36,145 E | * | 3/1999 | DeAguiar et al. | 345/511 |
| 5,953,522 A | * | 9/1999 | Fox et al. | 707/205 |
| 6,151,134 A | * | 11/2000 | Deppa et al. | 358/1.15 |

* cited by examiner

Primary Examiner—Mark Wallerson
(74) Attorney, Agent, or Firm—Oblon, Spivak, McClelland, Maier & Neustadt, P.C.

(57) ABSTRACT

In the printing apparatus according to the present invention, the central processing section determines as to whether an empty area required for loading of image data is available in a swap page used as a swap area of a real page or not, and directly loads the image data on the swap page and compresses the image data when an empty area is available in a memory of the swap page. On the other hand, when an empty area is not available, the central processing section loads the image data in a real page via a virtual frame buffer and transfers the image data to the swap page for compression thereof.

12 Claims, 8 Drawing Sheets

FIG.3

| OFFSET | LABEL | ATTRIBUTE | CONTENTS |
|---|---|---|---|
| 0 | ulink.fore | shartint | FORWARD LINK NUMBER |
| 2 | ulink.back | shartint | BACKWARD LINK NUMBER |
| 4 | crflag | unchar | FLAG |
| 5 | tlbno | unchar | TLB NUMBER, TLB NO.+1 WHEN USED ZERO WHEN NOT USED |
| 6 | unsize | shartint | DATA AREA SIZE OF A REAL PAGE OR A SWAP PAGE |
| 8 | unaddr | int | DATA AREA ADDRESS OF A REAL PAGE OR A SWAP PAGE |

FIG.4

| LABEL | ATTRIBUTE | CONTENTS |
|---|---|---|
| frammap | pointer | POINTER FOR A VIRTUAL FRAME BUFFER |
| cpuinit | pointer | HEADER POINTER FOR COMPRESS UNIT TABLE |
| cprbase | pointer | HEADER POINTER FOR A REAL PAGE |
| cprlink.fore | shortint | FORWARD LINK HEAD FOR A REAL PAGE UNIT TABLE |
| cprlink.back | shortint | BACKWARD LINK HEAD FOR A REAL PAGE UNIT TABLE |
| cpcmap | pointer | POINTER FOR A SWAP PAGE |

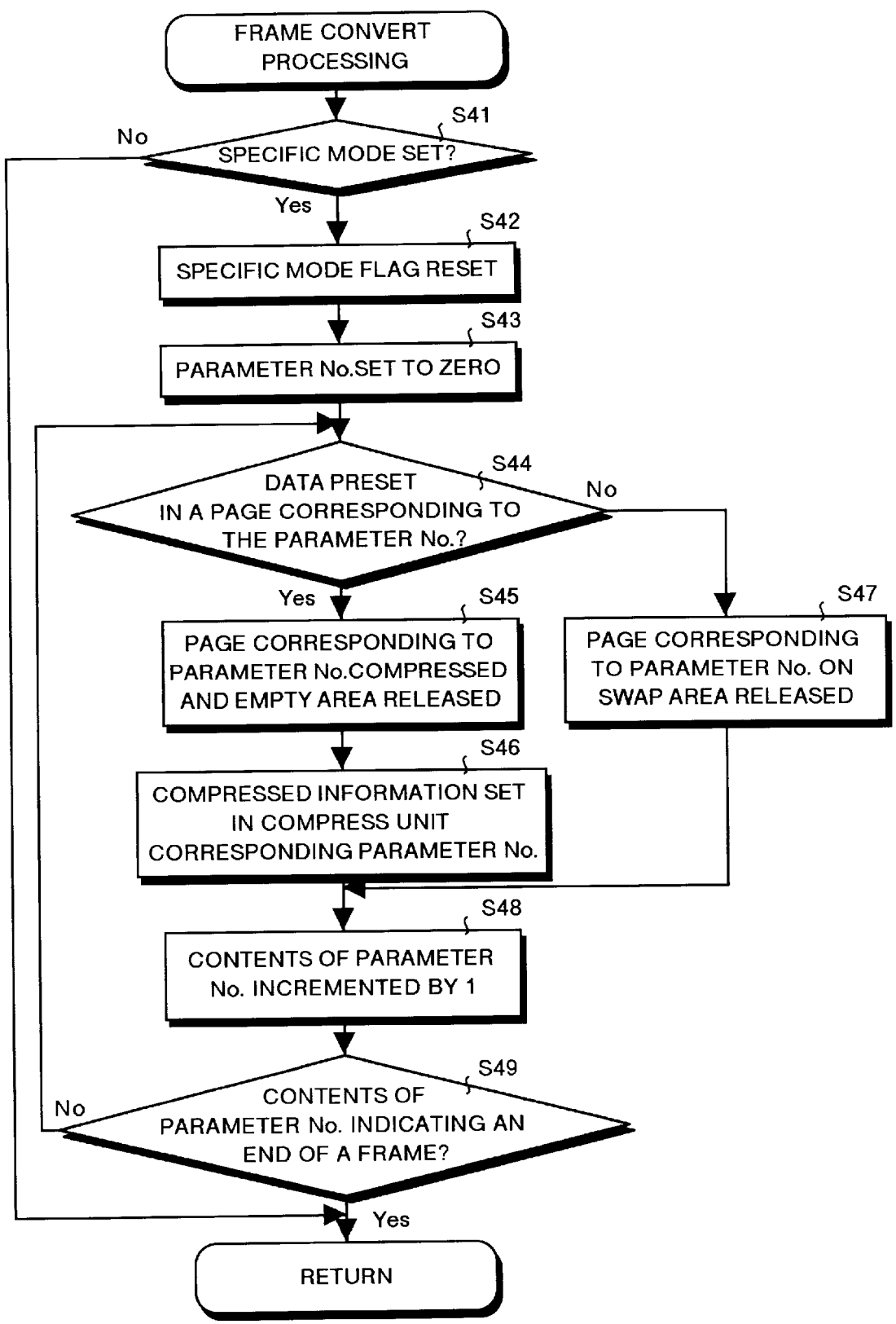

PRINTING APPARATUS AND IMAGE PROCESSING METHOD FOR THE PRINTING APPARATUS

FIELD OF THE INVENTION

The present invention relates to a printing apparatus and an image processing method for the printing apparatus, and more specifically to a printing apparatus capable of processing images with a smaller memory at a high speed and with high resolution and to an image processing method for the printing apparatus.

BACKGROUND OF THE INVENTION

In a printing apparatus such as a laser printer in which a stepping printing is difficult, a print image is drawn on a memory called frame buffer, and the image is transferred to a printer engine section according to movement of a polygon motor.

However, in the conventional type of image processing method for a printer, for instance, when printing an image on A3 size paper with the resolution of 400 dpi, a memory space of 8.5 MB is required on the frame buffer, and when printing with the resolution of 1200 dpi, a space memory of 34 MB is required on the frame buffer.

Further, as a frame buffer equivalent to 4 screens of a monochrome printing apparatus is required in a color printing apparatus, it is required to mount a large memory in the printing apparatus.

SUMMARY OF THE INVENTION

It is an object of the present invention to provide a printer capable of processing images with a small memory space and at a high speed with high resolution and an image processing method for the printer.

In the image processing method of the present invention, availability of an empty area in a swap memory used as a swap area of a page memory is checked, and when empty area is available, the image data is directly loaded in the swap memory and it is compressed, so that image processing can be executed with a small storage area at a high speed and with high resolution.

In the image processing method of the present invention, availability of an empty area in a swap memory used as a swap area of a page memory is checked, and when empty area is available, the image data is directly loaded in the swap memory and it is compressed, however, when empty area is not available, the image data is loaded in the page memory via a virtual storage area and then the image data is transferred to the swap memory for compression, so that image processing can be expressed with a small storage area at a high speed and with high resolution.

In the printing apparatus of the present invention, a determining unit is provided to determine the availability of an empty area in the swap memory, and a control unit is provided to directly load the image data in the swap memory and compressed the data when empty area is available, so that image processing can be executed with a small storage area at a high speed and with high resolution.

In the printing apparatus of the present invention, a determining unit is provided to determine the availability of an empty area in the swap memory, and a control unit is provided to directly load the image data in the swap memory and compressed the data when empty area is available, and to load the image data in the page memory via a virtual storage area and transfer the image data to the swap memory for compression when an empty area is not available, so that image processing can be executed with a small storage area at a high speed and with high resolution.

Other objects and features of this invention will become clear from the following description with reference to the accompanying drawings.

BRIEF DESCRIPTION OF THE DRAWINGS

FIG. 3 is a view showing configuration of a compress unit;

FIG. 4 is a view showing configuration of the management table shown in FIG. 2;

FIG. 9 is a flow chart for illustrating in detail the frame convert processing in FIG. 6.

DESCRIPTION OF THE PREFERRED EMBODIMENTS

Figure 1:
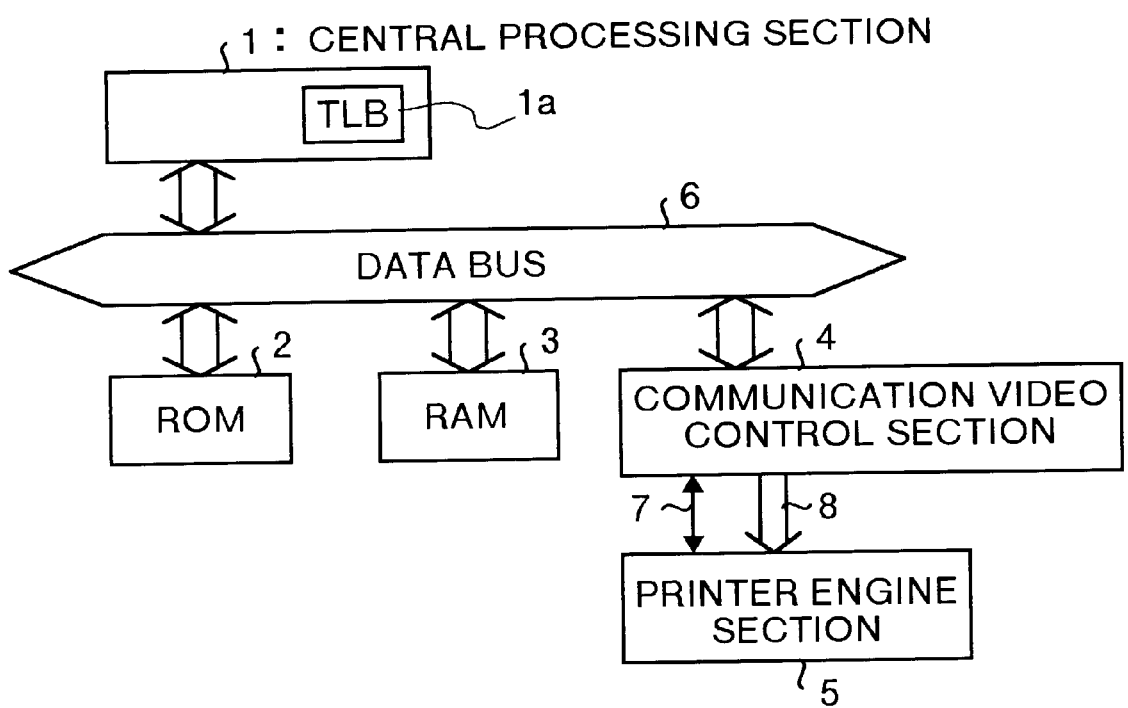
FIG. 1 is a block diagram showing configuration of a printing apparatus according to the present invention.

The present invention relates to an image processing method of drawing an image on a memory and transferring the drawn image to a printer engine for printing according to movement of a polygon motor in a printing apparatus such as a laser printer in which it is difficult to execute stepping printing, and more specifically to a printing apparatus capable of processing images with a virtual storage area and an image processing method for the printing apparatus.

The printing apparatus according to the present invention has, for instance, an engine control task, a printing control task, a frame buffer acquiring task, a frame convert task, a drawing task, a printer engine emulating task and a compressing/extending task. The engine control task is for controlling a printer engine. The printing control task is for providing controls for printing such as paper feed, video start, and specification of a tray in association with the engine control task.

The frame buffer acquiring task is for allocating a frame buffer on a virtual storage area (virtual frame buffer) when an empty memory space larger than a frame buffer for drawing an image is not available in a swap area (swap page) of a page memory and allocating the frame buffer on the swap area when an empty memory space larger than a frame buffer for drawing an image is available in the swap area (swap page). It should be noted that the frame buffer is defined in this specification as an area for loading image data for one page.

The frame convert task is for releasing a page memory (real page) according to a result of frame buffer allocation in the frame buffer acquiring task. The drawing task is for drawing an image on a frame buffer. The printer emulation task is for instructing the drawing task to draw image data received from a host device on a frame buffer. The compressing/extending task is for compressing or extending image data.

In the printing apparatus according to the present invention, a plurality of frame buffers each for drawing an image thereon are allocated on a virtual storage area (virtual frame buffer), and a page memory (real page) and a swap area (swap page) are allocated on a real storage area of a RAM. Herein, when the drawing task starts drawing an image on a frame buffer on the virtual storage area, as a page memory and an area for reading and writing image data stored in a frame buffer on the virtual storage area has not been registered in a TLB (Translation Look-aside Buffer), TLB exception is generated with the drawing task stopped, and a compress unit number corresponding to a frame buffer in which the TLB exception has been generated is sent to the compressing/extending task. The compressing/extending task finds a page memory corresponding to the compress unit, sets the page memory in TLB, and restarts the stopped drawing task. The drawing task reads image data from or writes image data in the page memory set in the TLB.

When the page memory becomes full, the compressing/extending task moves the image data from the page memory to a swap area. When the swap area becomes full, executes reversible processing for compression to data in the swap area to generate an empty area in the swap page, and moves data from the real page to the swap page. With this operation, print processing can be executed with a smaller storage area.

Also in the printing apparatus according to the present invention, when an empty area in a swap area is larger than a frame buffer for drawing an image, a frame buffer is allocated to the swap area with the frame buffer acquiring task, the image data is directly loaded on the swap area and it is compressed, so that it is prevented that the printing speed especially for a first page from being delayed by overhead for swap-in and swap-out.

Then image data in a page memory or a swap area is compressed or extended with the compressing/extending task with the compressed or extended image data transferred to a printer engine section for printing.

Detailed description is made for a preferable embodiment of the printing apparatus according to the present invention and a printing apparatus in which the image processing method according to the present invention is applied.

FIG. 1 is a block diagram showing configuration of the printing apparatus according to the present invention. The printing apparatus according to the present invention comprises, as shown in FIG. 1, a central processing section (a means for calculations, determination and control) for controlling operations of each section of the printing apparatus, a ROM 2 for storing therein a control program for the central processing section and fonts or the like, a RAM 3 having a data storage area and an image data storage area, a printer engine section 5, a communication video control section 4 for transmitting image data via a serial interface (not shown) to the printer engine section 5, and a printer engine section 5 for printing on a paper according to the image data transmitted from the communication video control section 4.

Figure 2:
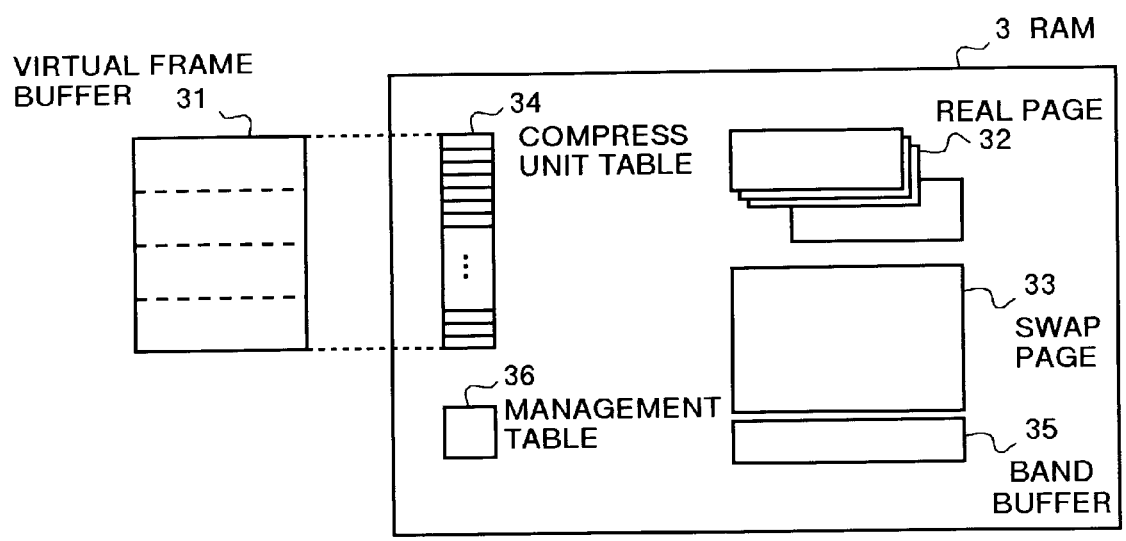
FIG. 2 is a view showing an example of configuration of a storage area in the RAM shown in FIG. 1.

Next detailed description is made for configuration and functions of the central operating section 1 as well as of the RAM 3. FIG. 2 is a view showing an example of memory configuration (real storage area) in the RAM 3 and a virtual storage area. The central processing section 1 manages a virtual frame buffer (virtual storage area) 31 having a plurality of frame buffer each for drawing an image thereon. The RAM 3 has a real storage area comprising, as shown in the figure, a real page (page memory) 32, a swap page (swap area) 33, a compress unit table 34, a band buffer 35, and a management table 36.

The real page 32 is a real memory corresponding to the virtual frame buffer 31, and when the central processing section 1 accesses the virtual frame buffer 31, image data is read out from or written in this real page 32 via a TLB 1a (Refer to FIG. 1).

The swap page 33 is a swap area of the real page 32, and usually swaps out the real page 32 not being accessed currently when the real page 32 overflows.

The compress unit table 34 is a group of the compress units shown in FIG. 3. In this figure, "ulink.fore" indicates a forward link number, "ulink.back" indicates a backward link number, "crflag" indicates a flag, "tlbno" indicates a number of TLB (TLBNO+1 when used and zero when not used), "unsize" indicates data area size of a real page or a swap page, and "unaddr" indicates a data area address of the real page or swap page. One compress unit is allocated for virtual page size of the virtual frame buffer 31, for instance, one unit for 4 KB. For this reason, (virtual frame buffer compress unit table)=(a number of compress units)×(virtual page size).

The band buffer 35 is an area for extending (reproducing) image data stored in the real page 32 and swap page 33 and temporally storing therein according to the compress unit table 34.

The management table 36 stores therein data used by the central processing section 1 for managing each of the areas described above (virtual frame buffer 31, real page 32, swap page 33 and band buffer 35). The "frammap", as show in FIG. 4, indicates a pointer for the virtual frame buffer 31, "cpunit" indicates a pointer at the head of the compress unit table, "cprbase" indicates a pointer at the head of the real page 32, "cprlink.fore" indicates a forward link head of a unit table for the real page 32, "cprlink.back" indicates a backward link head of a unit table for the real page 32, and "cpcmap" indicates a pointer to the swap page 33.

Figure 5:
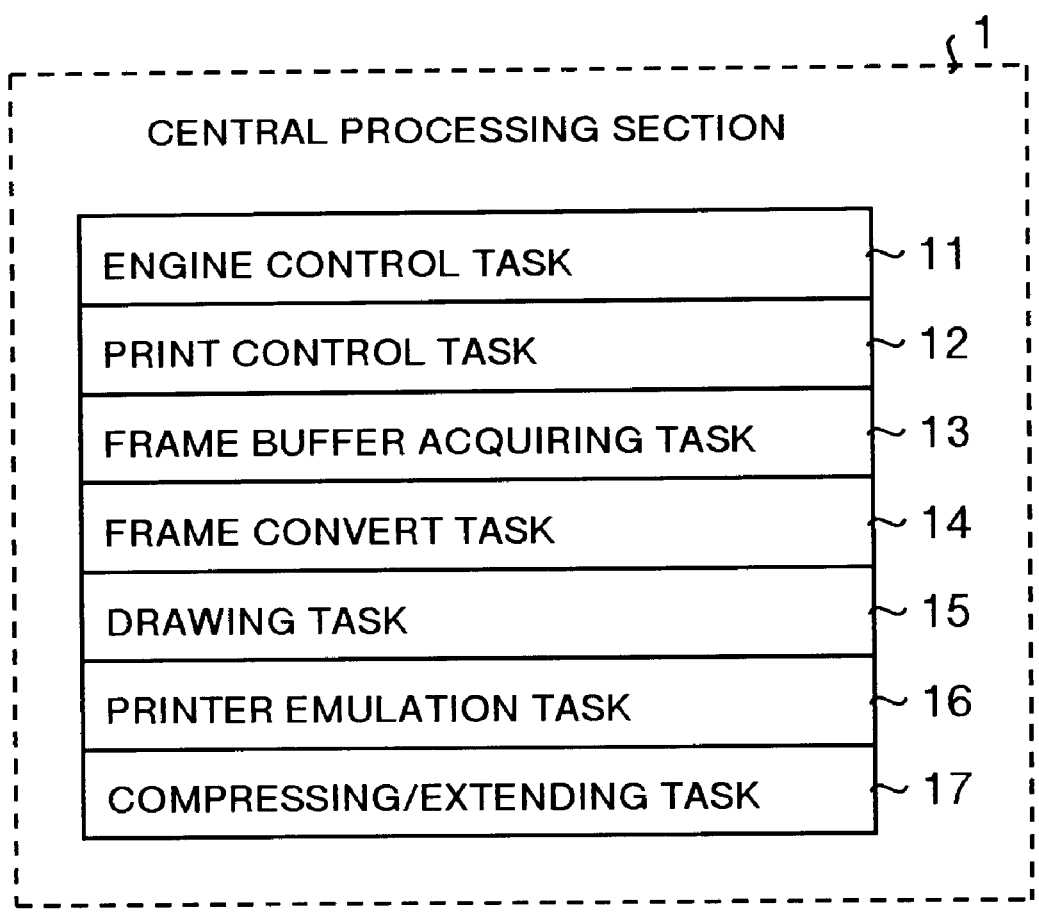
FIG. 5 is a view showing functions of the central processing section shown in FIG. 2.

The central processing section 1 is a unit for controlling operations of the entire printing apparatus, and manages the virtual frame buffer 31 with a translation look-aside buffer section (TLB 1a). FIG. 5 is a view functionally showing the central processing section 1.

The central processing section 1 has, as shown in FIG. 5, an engine control task 11, a print control task 12, a frame buffer acquiring task 13, frame convert task 14, a drawing task 15, a printer emulation task 16, and compressing/extending task 17. Each of the tasks is realized in a multitask manner.

The engine control task 11 is for controlling the printer engine section 5. The print control task 12 is for providing controls such as paper feed, video start, and tray specification to the engine control task 11. The frame buffer acquiring task 13 is for allocating a frame buffer on a virtual frame buffer (virtual storage area) 31 when there is no empty area larger than the size of a frame buffer used for drawing a picture thereon in a swap page 33 and reallocating a frame buffer onto the swap page 33 when there is an empty area larger than size of a frame buffer used for drawing an image in the swap page 33. The frame convert task 14 is for converting a frame in the swap page 33 to the virtual frame buffer 31 when the frame buffer acquiring task 13 allocates a frame buffer to the swap page 33.

The drawing task 15 is for drawing an image on the allocated frame buffer. The printer emulation task 16 is for instructing the drawing task 15 to draw image data received from a host device (not shown) on a frame buffer. The compressing/extending task 17 is for extending or compressing image data.

Figure 6:
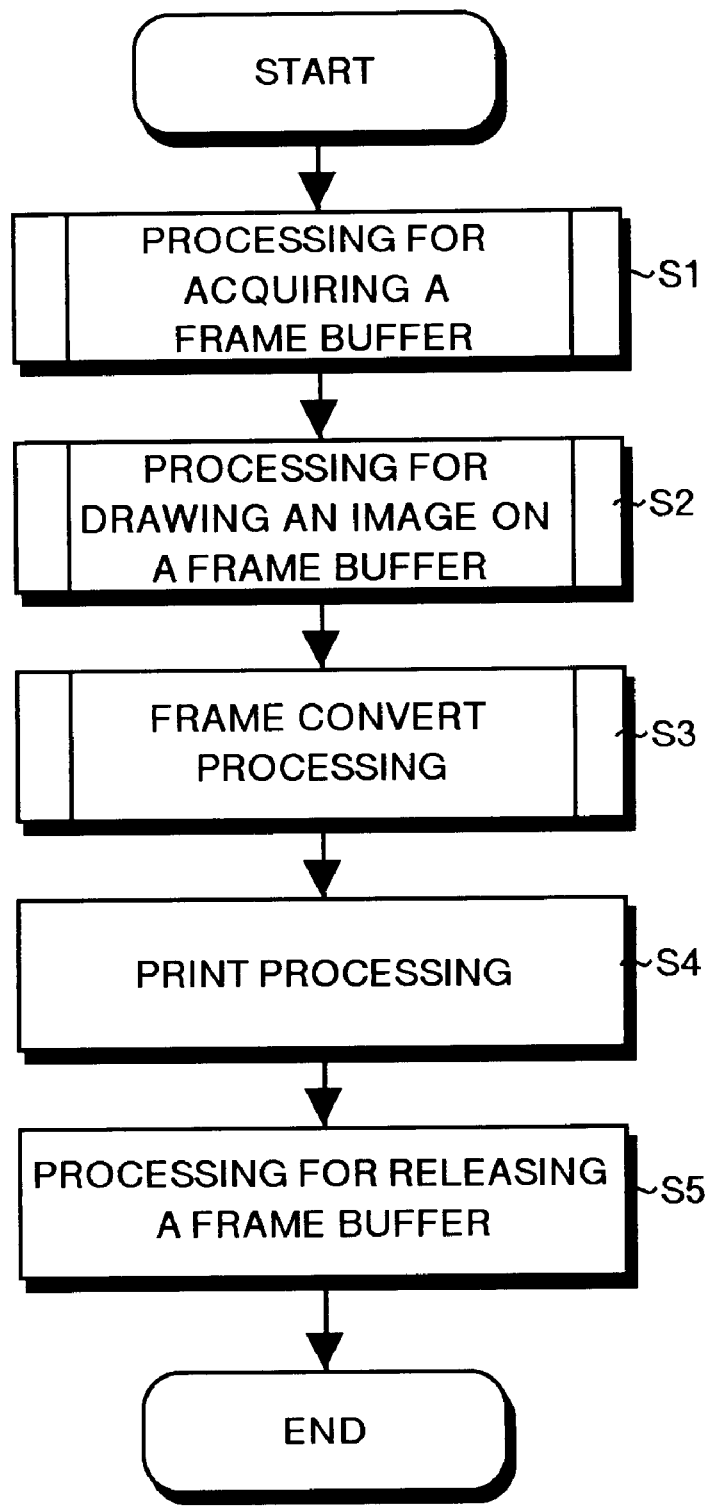
FIG. 6 is a flow chart for illustrating a main flow of printing operations executed by the printing apparatus in FIG. 1.

Next description is made for printing operations executed by the printing apparatus having the configuration as described above. FIG. 6 is a flow chart for illustrating a main flow of printing operations executed by the printing apparatus, FIG. 7 is a flow chart for illustrating in detail the processing for acquiring a frame buffer (step S1) in FIG. 6, FIG. 8 is a flow chart for illustrating in detail the processing for drawing an image on a frame buffer (step S2) in FIG. 6, and FIG. 9 is a flow chart for illustrating in detail the frame convert processing (step S6) in FIG. 6.

Next description is made for general operations executed by the printing apparatus under controls by the central processing section 1 with reference to FIG. 6. The central processing section 1 executes the frame buffer acquiring processing to fetch a frame buffer (step S1). Next the central processing section 1 executes the processing for drawing an image on a frame buffer to drawing an image on the acquired frame buffer (step S2). Then, the central processing section 1 executes the frame convert processing to convert a frame (step S3). Then the central processing section 1 executed the print processing to print image data on transfer paper (step S4). Finally, the central processing section 1 executes processing for releasing a frame buffer to release the acquired frame buffer (step S5).

Figure 7:
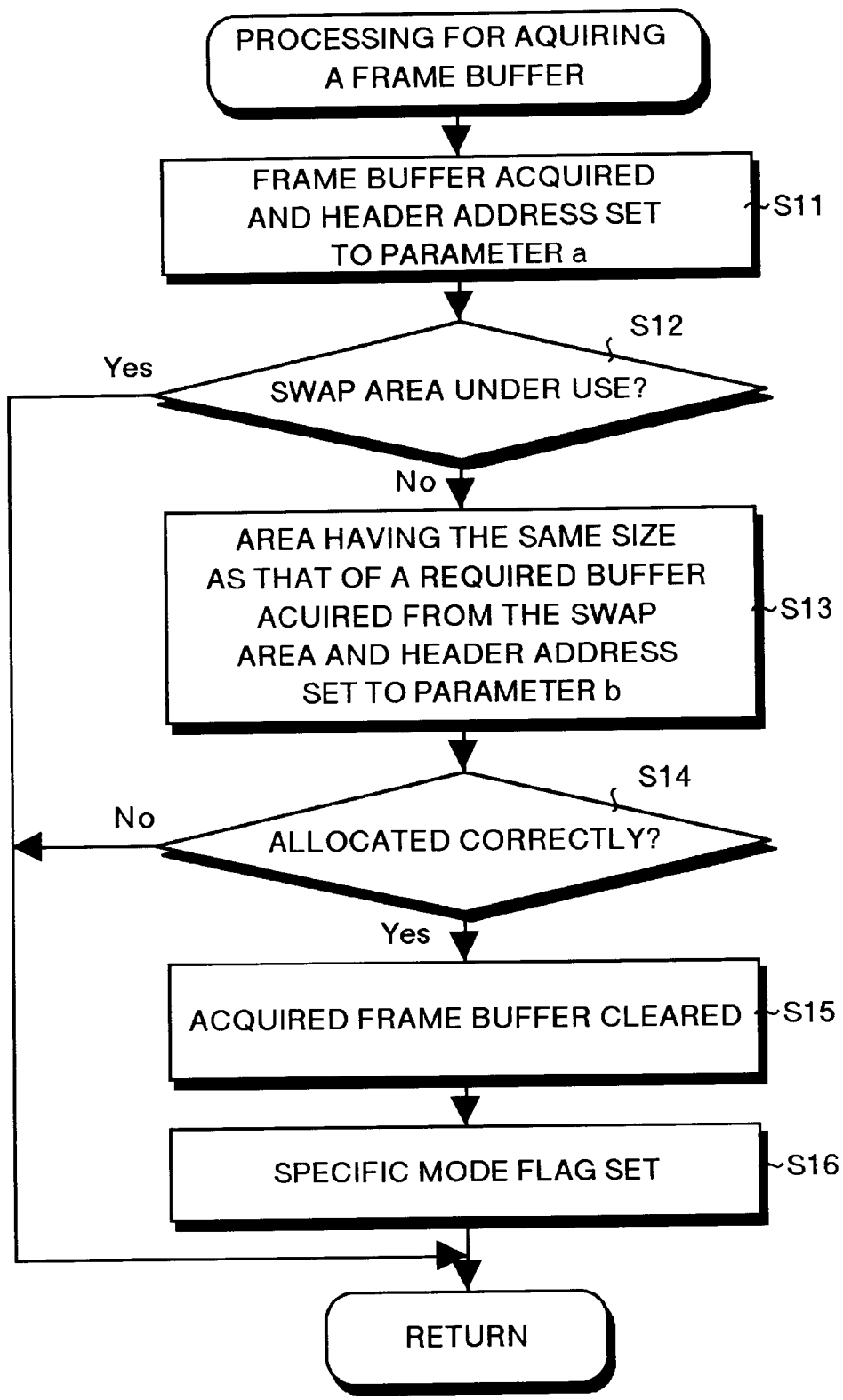
FIG. 7 is a flow chart for illustrating in detail the processing for acquiring image data into the frame buffer in FIG. 6.
Figure 8:
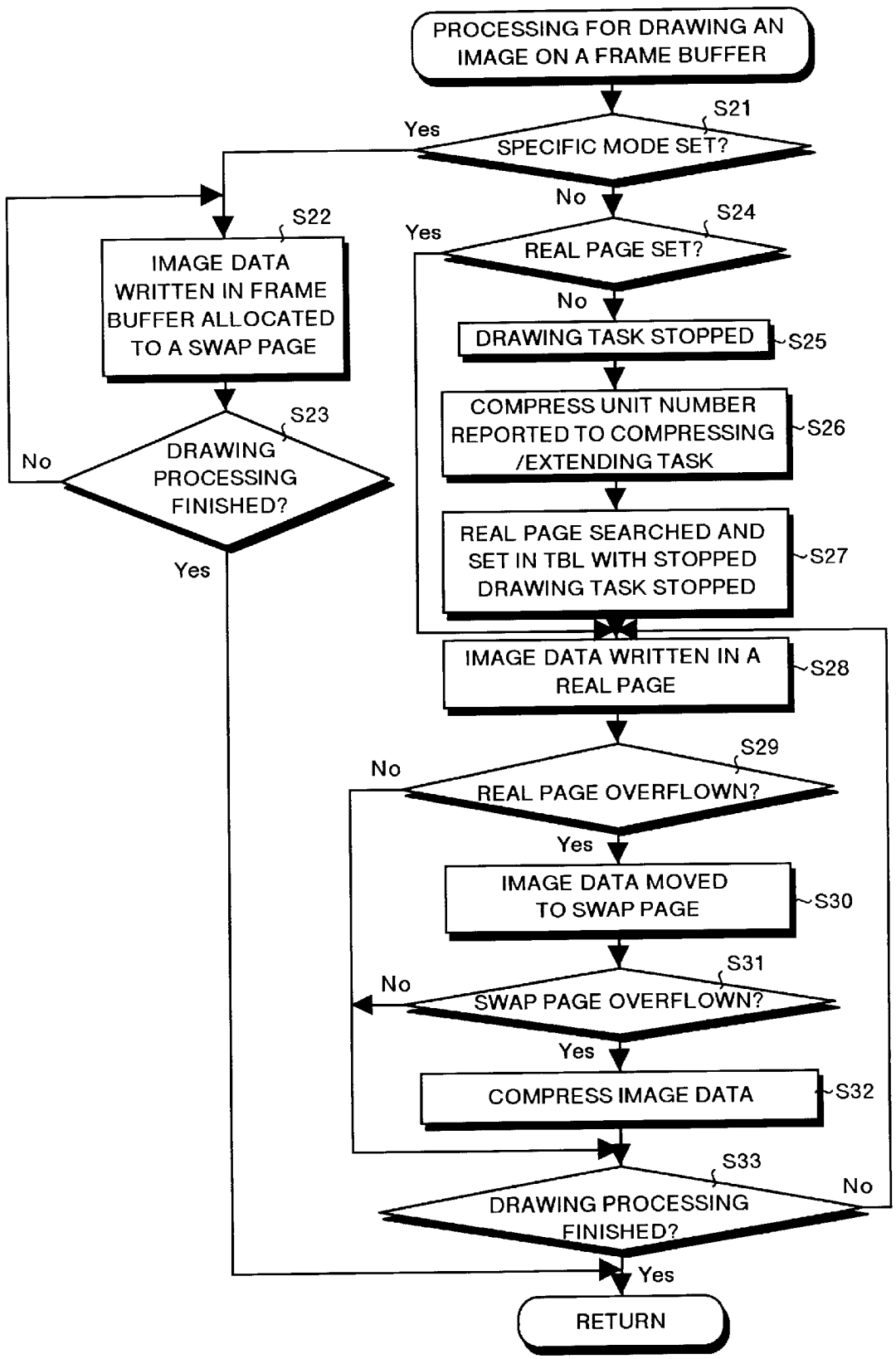
FIG. 8 is a flow chart for illustrating in detail the processing for drawing an image on the frame buffer in FIG. 6.

Detailed description is made for contents of the processing for acquiring a frame buffer with reference to FIG. 7.

As shown in FIG. 7, in the frame buffer acquiring task 13, at first a frame buffer is acquired on the virtual frame buffer 31, and the header address is set to parameter a (step S11). Then in the frame buffer acquiring task, the swap page 33 is checked and determination is made as to whether the swap area is under use or not, namely as to whether there is an empty area required for loading of image data is available or not (step S12). As a result of this determination, in the frame buffer acquiring task 13, when the swap area is under used, namely when there is no empty area available, the operation shifts to step S21 of FIG. 8.

On the other hand, when the swap page 33 is not being used, namely when there is an empty area available, in the frame buffer acquiring task 13, an area with the same size as that of a required frame buffer is allocated, and the header address is set to parameter b (step S13). Then in the frame buffer acquiring task 13, a frame buffer is allocated to the swap page 33, and determination is made as to whether location of the frame buffer has been executed correctly or not (step S14). As a result of this determination, when it is determined that the allocation was not executed correctly in the frame buffer acquiring task 13, system control shifts to step S21 of FIG. 8. On the other hand, when it is determined that the allocation was executed correctly in the frame buffer acquiring task 13, the frame buffer (virtual frame buffer 31) acquired in step S11 is cleared (step S15), and a specific mode flag indicating that a frame buffer has been allocated to the swap page 33 is set to ON state (step S16).

Namely when an empty area larger than size of a frame buffer for drawing an image thereon is not available in the swap page 33, in the frame buffer acquiring task, a frame buffer is allocated on the virtual frame buffer 31. On the other hand, when an empty area is available in the swap page 33 (swap area) larger than the size of a frame buffer for drawing an image, a frame buffer is allocated onto the page buffer 33. As described above, by allocating the frame buffer 31 to the swap page 33 in a real storage area, the TLB exception is not generated as described later, so that exchange of data with the TLB exception is not required, and first print (printing on the first sheet of print paper) can be made at a faster speed.

Detailed description is made for contents of the processing for drawing an image on a frame buffer in the step S2 with reference to the flow chart shown in FIG. 8.

As shown in FIG. 8, in the drawing task 15, at first determination is made as to whether a specific mode has been set or not, namely whether the specific mode flag has been set to the ON state or not (step S21). As a result of this determination, when it is determined that the specific mode has been set, system control shifts to step S22 with image data written in the frame buffer allocated to the swap page 33 (step S22), and the operation of writing the image data is continued under the processing for drawing the image is finished (step S23). With this operation, as described above, the TLB exception is not generated, so that exchange of data with the TLB exception is not required and the processing can be executed at a faster speed.

On the other hand, in the drawing task 15, when it is determined that a specific mode has not been set, determination is made as to whether a real page 32 corresponding to the frame buffer allocated to the virtual frame buffer 31 has been set or not (step S24). As a result of this determination, when it is determined that the corresponding real page 32 has been set, system control shifts to step S28. On the other hand, when it is determined that the corresponding real page 32 has not been set, the TLB exception is generated with the drawing task 15 stopped (step S25), and a compress unit number corresponding to the frame buffer in which the TLB exception has been generated is reported to the compressing/extending task 17 (step S26). Then, in the compressing/extending task 17, the real page 32 corresponding to the reported compress unit number is searched, and the stopped drawing task 15 is restarted by setting the TLB 1a (step S27).

Then in the drawing task 15, image data is read out from or written in the real page 32 set in the TLB 1a (step S28). When the real page 32 becomes full (step S29), image data in the real page 32 is transferred to the swap page 33 by executing the compressing/extending task 17 (step S30), and when the swap page 33 becomes full (step S31), an empty area is generated in the swap page 33 by compressing the image data in the swap page 33 (step S32). The operations (step S28 to S32) are repeated until the processing for drawing an image is finished (step S33).

Next detailed description is made for contents of the frame convert processing in the step S3 with reference to the flow chart shown in FIG. 9.

In FIG. 9, in the frame convert task 14, at first determination is made as to whether the specific mode has been set or not (step S41), and the processing returns to step S4 when the specific mode has not been set.

On the other hand, when it is determined that the specific mode has been set, in the frame buffer convert task 14, the specific mode flag is reset to zero with the next processing prepared (step S42), and also parameter no is set to zero to prepare for conversion (step S43).

Then in the frame convert task 14, determination is made as to whether data is present on the swap page 33 corresponding to the parameter no or not (step S44), and as a result of this determination, when it is determined that data is present, the data on the page is compressed by executing the compressing/extending task 17 to release an empty area realized because of data compression step S45), and the compressed information is set in the compress unit table 34 corresponding to the parameter no (step S46).

On the other hand, in step S44, when it is determined that data is not present on the swap page 33 corresponding to the parameter no, system control shifts to step S47 to release the page (step S47).

Then in step S48, in the frame convert task 14, the parameter no is incremented by 1 to indicate a next page (step S48), and then the processing (step S44 to S48) is repeated until the parameter no indicates an end of the frame (step S49). As described above, when it is determined that data is not present on the swap page 33, the swap page 33 is released as it is, and when it is determined that data is present on the swap page 33, data is compressed and the compressed information is set in the compress unit table 34, so that a place where the compressed data is stored can be known only by referring to the compress unit table 34 in the next print processing.

As described above, when the frame convert processing is finished, the image data is present on the real page 32 or the swap page 33 because of the processing described above, and for this reason, in the compressing/extending task 17, the image data on the real page 32 or swap page 33 is extended or compressed and set in the band buffer 35, and the image data is transferred via the communication video control section 4 to the printer engine section 5 for printing according to step S4 shown in FIG. 6. After the print processing is executed, as shown in step S5 in FIG. 6, the central processing section 1 releases the frame buffer to prepare for the next processing.

As described above, in this embodiment, determination is made as to whether an empty memory space required for loading of image data is available in the swap page 33 used as a swap page of the real page 32 or not, and when empty is available on the swap page, the image data is directly loaded on the swap page 33, and the loaded image data is compressed, so that image processing can be executed with a small storage area at a high speed and with high resolution. Especially, when processing a first image, drawing is executed in a real storage area, and the image data is compressed after the entire image is drawn, so that the first image can be printed at a high speed.

Also in this embodiment, when there is no empty area available in the swap page 33, image data is loaded on the real page 32 via the virtual frame buffer 31, and the image data is transferred to the swap page 33 and compressed there, so that the second image and on can be printed at a high speed with high resolution.

It should be noted that the present invention is not limited to the embodiment described above, and can be modified without changing a gist of the invention.

As described above, with the image processing method for a printing apparatus capable of loading image data via a virtual storage area in a page memory, it is determined whether an empty area required for loading of image data is available in a swap memory used as a swap area of a page memory or not, and when empty area is available, the image data is directly loaded in the swap memory and it is compressed, so that image processing can be executed with a small storage area at a high speed and with high resolution, and especially printing for the first sheet can be executed at a high speed.

With the image processing method for a printing apparatus capable of loading image data via a virtual storage area in a page memory, it is determined whether an empty area required for loading of image data is available in a swap memory used as a swap area of the image memory or not, and when an empty area is available, the image data is directly loaded on the swap memory and it is compressed, however, when an empty area is not available, the image data is loaded in the page memory via a virtual storage area and then the image data is transferred to the swap memory for compression, so that image processing can be expressed with a small storage area at a high speed and with high resolution, and especially printing for the first page can be executed at a high speed, and further printing for the second page and on can be executed under good conditions.

With the printing apparatus capable of loading image data via a virtual storage area in a page memory according to the present invention, the swap memory has a swap area for a page memory, the determining unit determines whether an empty area required for loading of image data in the swap memory is available or not, the control unit directly loads the image data in the swap memory and compresses the image data when an empty area is available, so that image processing can be executed with a small storage area at a high speed and with high resolution, and especially printing for the first sheet can be executed at a high speed.

With the printing apparatus capable of loading image data via a virtual storage area in a page memory according to the present invention, the swap memory has a swap area for a page memory, the determining unit determines whether an empty area required for loading of image data in the swap memory is available or not, the control unit directly loaded the image data in the swap memory and compresses the loaded image data when an empty area is available, however, loads image data in the page memory via a virtual storage area and transfers the image data to the swap memory for compression when an empty area is not available, so that image processing can be executed with a small storage area at a high speed and with high resolution, and especially printing for the first sheet can be executed at a high speed, and also printing for the second sheet and on can be executed under good conditions.

This application is based on Japanese patent applications No. HEI 9-278031 and No. HEI 10-250082 filed in the Japanese Patent Office on Sep. 26, 1997 and Sep. 3, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing method for a printer capable of loading image data in a page memory via a virtual storage area, said method comprising the steps of:

determining whether an empty area required for loading an image data is available in a swap memory used as a swap area for the page memory; and directly loading image data in the swap memory when the empty area is available in the swap memory and compressing the image data.

2. An image processing method according to claim 1, wherein the page memory and the swap memory are both included in a same memory.

3. An image processing method according to claim 1, wherein the virtual storage area is linked to the page memory via a translational look-aside buffer, and the translational look-aside buffer changes an access to the virtual storage area to an access to the page memory.

4. An image processing method for a printer capable of loading image data in a page memory via a virtual storage area, said method comprising the steps of:

determining whether an empty area required for loading an image data is available in a swap memory used as a swap area for the page memory;

directly loading image data in the swap memory when the empty area is available in the swap memory and compressing the image data; and loading the image data in the page memory via the virtual storage area when the empty area is not available in the swap memory and transferring the loaded image data from the virtual storage area to the swap memory for compression.

5. An image processing method according to claim 4, wherein the page memory and the swap memory are both included in a same memory.

6. An image processing method according to claim 4, wherein the virtual storage area is linked to the page memory via a translational look-aside buffer, and the translational look-aside buffer changes an access to the virtual storage area to an access to the page memory.

7. A printing apparatus comprising:

a page memory configured to load an image data via a virtual storage area;

a swap memory used as a swap area for the page memory;

a determining unit configured to determine whether an empty area is available in the swap memory for loading the image data;

a control unit configured to directly load image data in the swap memory when the empty area is available in the swap memory and to compress the image data; and a printer engine configured to extend the compressed image data and to print the image data on a paper.

8. A printing apparatus as in claim 7, wherein the page memory and the swap memory are both included in a same memory.

9. A printing apparatus according to claim 7, wherein the virtual storage area is linked to the page memory via a translational look-aside buffer, and the translational look-aside buffer changes an access to the virtual storage area to an access to the page memory.

10. A printer apparatus comprising:

a page memory for loading an image data via a virtual storage area;

a swap memory used as a swap area for the page memory;

a determining unit for determining as to whether an empty area is available in the swap memory for loading the image data;

a control unit configured to directly load image data in the swap memory when the empty area is available in the swap memory and compressing the image data, and for loading the image data in the page memory via the virtual storage area when the empty area is not available in the swap memory and then transferring the image data from the virtual storage area to the swap memory for compression; and a printer engine for extending the compressed image data and printing the image data on a paper.

11. A printing apparatus as in claim 10, wherein the page memory and the swap memory are both included in a same memory.

12. A printing apparatus according to claim 10, wherein the virtual storage area is linked to the page memory via a translational look-aside buffer, and the translational look-aside buffer changes an access to the virtual storage area to an access to the page memory.

\* \* \* \* \*